No. 774,583. PATENTED NOV. 8, 1904.
D. Y. HALLOCK.
POTATO DIGGER.
APPLICATION FILED MAR. 2, 1904.
NO MODEL. 7 SHEETS—SHEET 1.

WITNESSES
INVENTOR
Daniel Y. Hallock,
BY
his Attorney

No. 774,583. PATENTED NOV. 8, 1904.
D. Y. HALLOCK.
POTATO DIGGER.
APPLICATION FILED MAR. 2, 1904.
NO MODEL. 7 SHEETS—SHEET 3.

*Fig. 3.*

WITNESSES:

INVENTOR
Daniel Y. Hallock
BY
his Attorney

No. 774,583. PATENTED NOV. 8, 1904.
D. Y. HALLOCK.
POTATO DIGGER.
APPLICATION FILED MAR. 2, 1904.
NO MODEL. 7 SHEETS—SHEET 4.
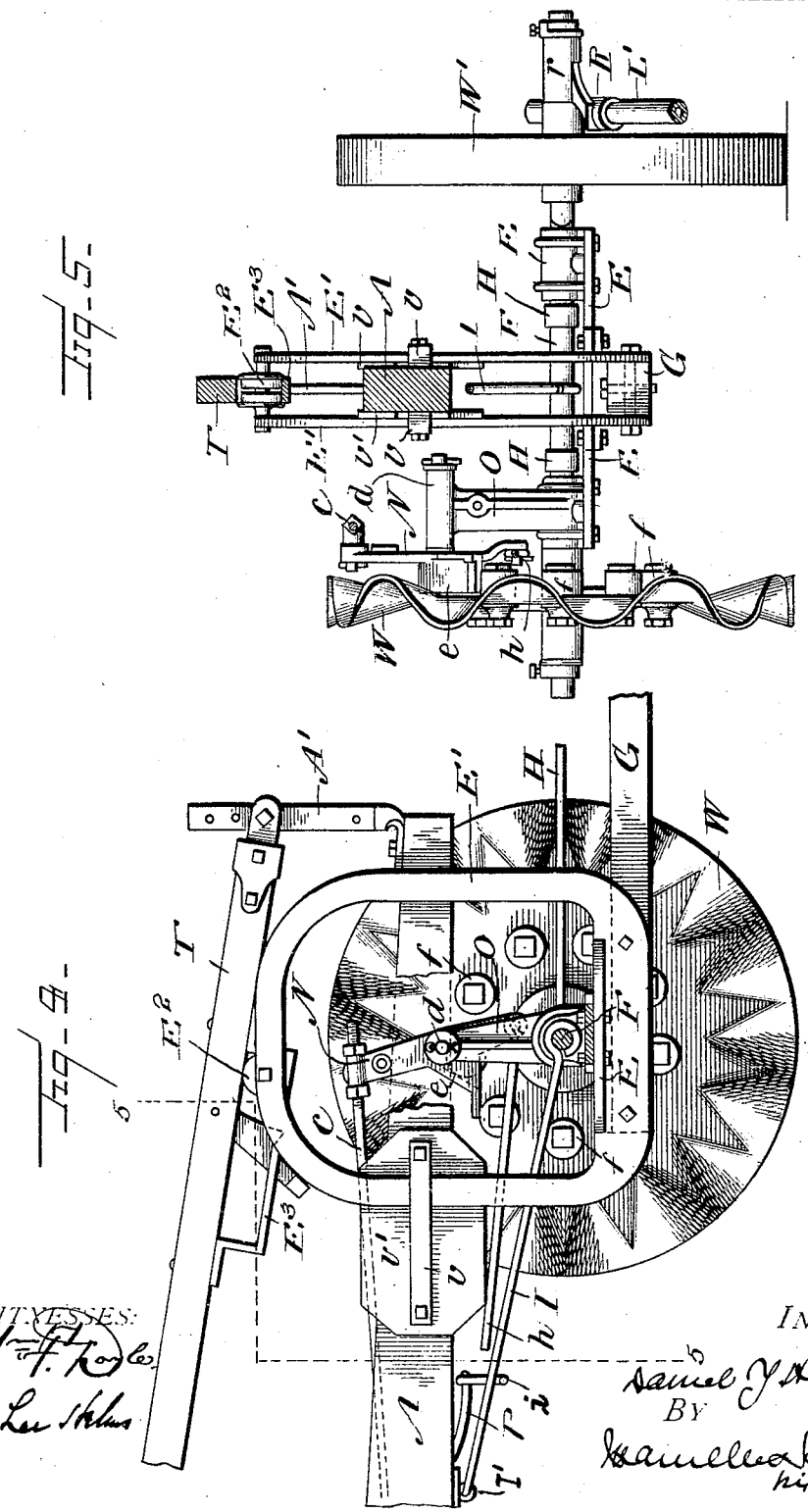

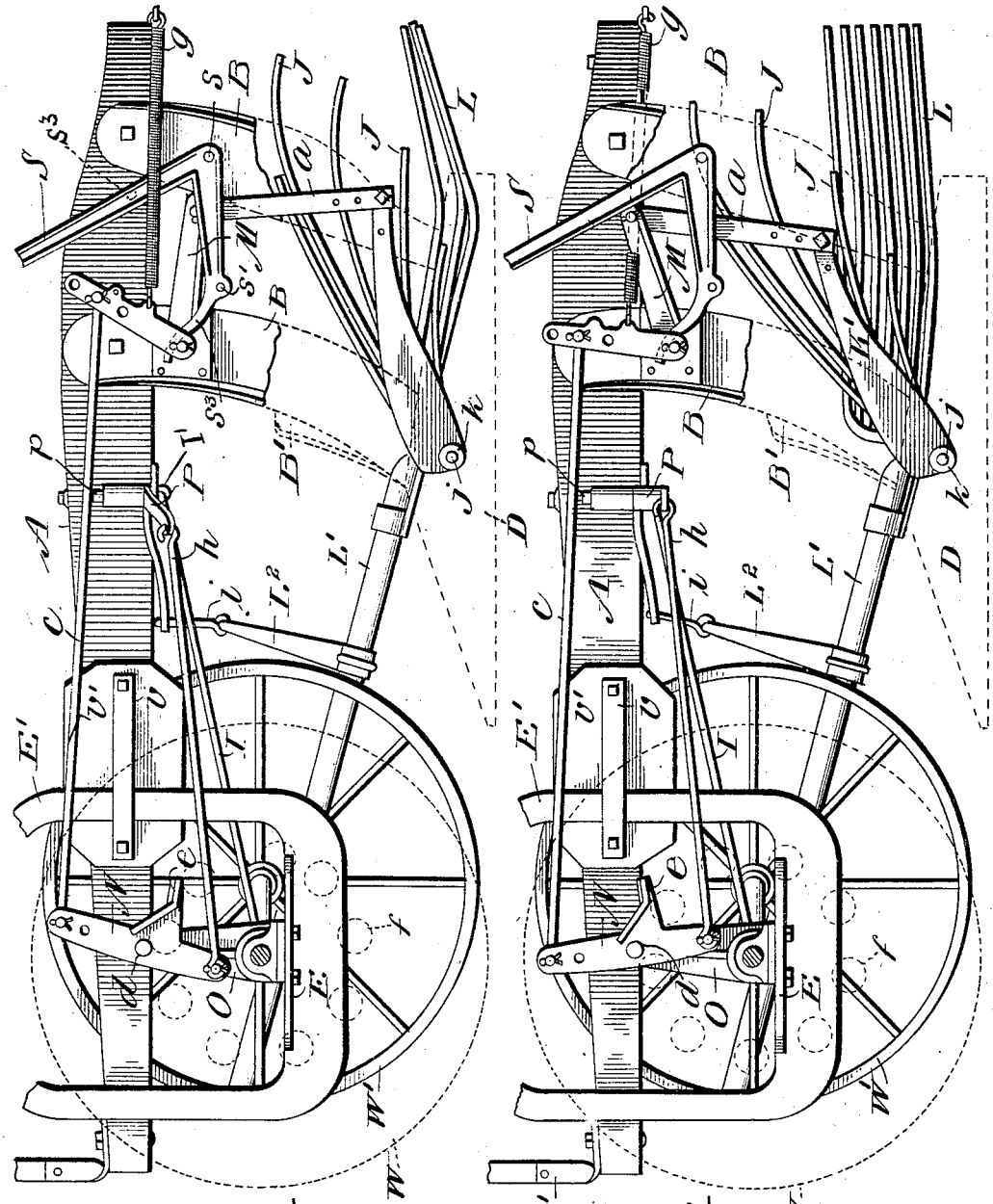

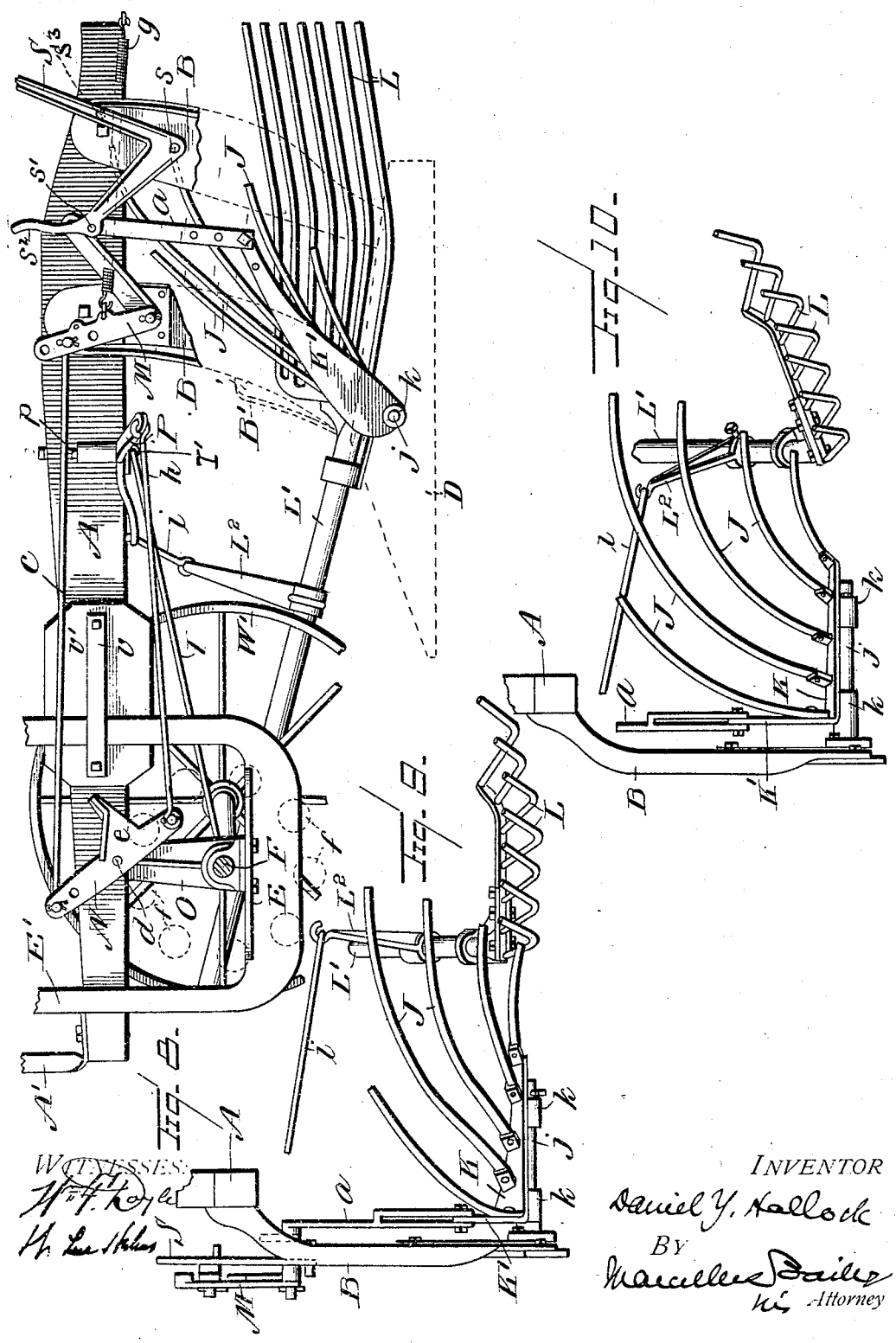

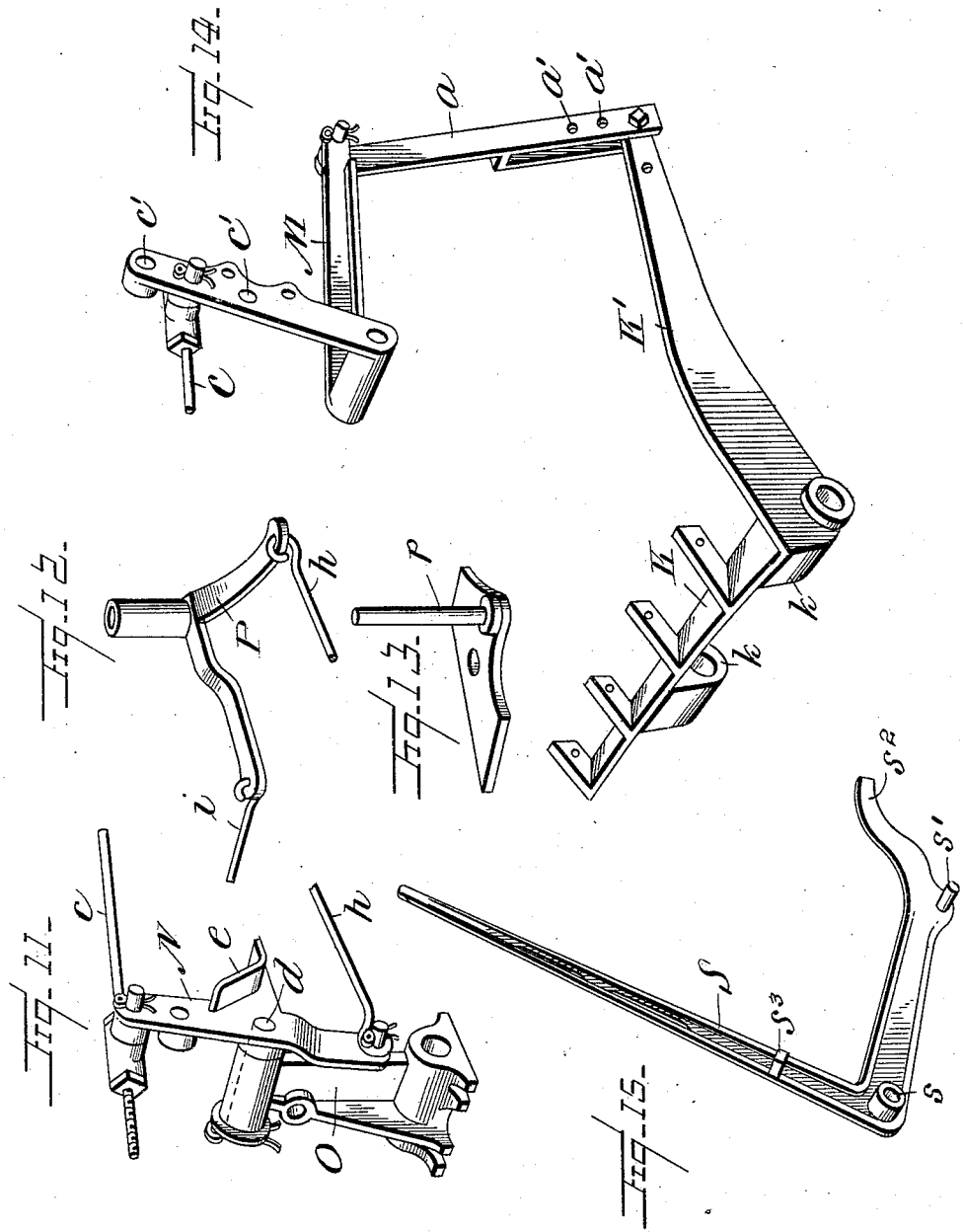

No. 774,583.

Patented November 8, 1904.

UNITED STATES PATENT OFFICE.

DANIEL Y. HALLOCK, OF YORK, PENNSYLVANIA.

POTATO-DIGGER.

SPECIFICATION forming part of Letters Patent No. 774,583, dated November 8, 1904.

Application filed March 2, 1904. Serial No. 196,175. (No model.)

*To all whom it may concern:*

Be it known that I, DANIEL Y. HALLOCK, a citizen of the United States, and a resident of York, in the county of York and State of Pennsylvania, have invented certain new and useful Improvements in Potato-Diggers, of which the following is a specification.

My invention relates to that kind of potato-digger in which the shovel or share and a vibratory screen are combined with means for turning over the potato-row taken up by the shovel or share as it passes back to the screen, said means consisting usually of a sectional moldboard fixed to the standard.

The main characteristic of my invention is that I combine with the share or shovel a vibratory skeleton or grid-like moldboard which acts, as does the moldboard of a plow, to turn over the earth passing to it from the share or shovel and acts also as a screen to permit the earth to separate from the potatoes, thus uniting in itself the two functions of moldboard and screen, at the same time reducing to a minimum the liability of the machine to clog. In some instances—as, for example, when the cultivation or planting is extremely deep—I employ for the purpose of completing the work of separation a second screen or fork, which drags on the ground alongside the skeleton moldboard, receiving the potatoes and turned-over earth thrown laterally by the vibratory moldboard and having an oscillatory movement of its own in a direction to throw its load toward the moldboard. The result is that very thorough separation is effected, and the potatoes are deposited in a windrow about midway between the paths of travel of the plow and the separator-fork. The separator-fork and its actuating mechanism are so arranged that they may be easily fitted to or removed from the machine. Without the separator-fork the machine is well fitted, not only in many instances as a potato-digger, but also for ordinary farm use as a pulverizing-plow.

The nature of the invention and the manner in which the same is or may be carried into effect will be readily understood by reference to the accompanying drawings, in which—

Figure 1:
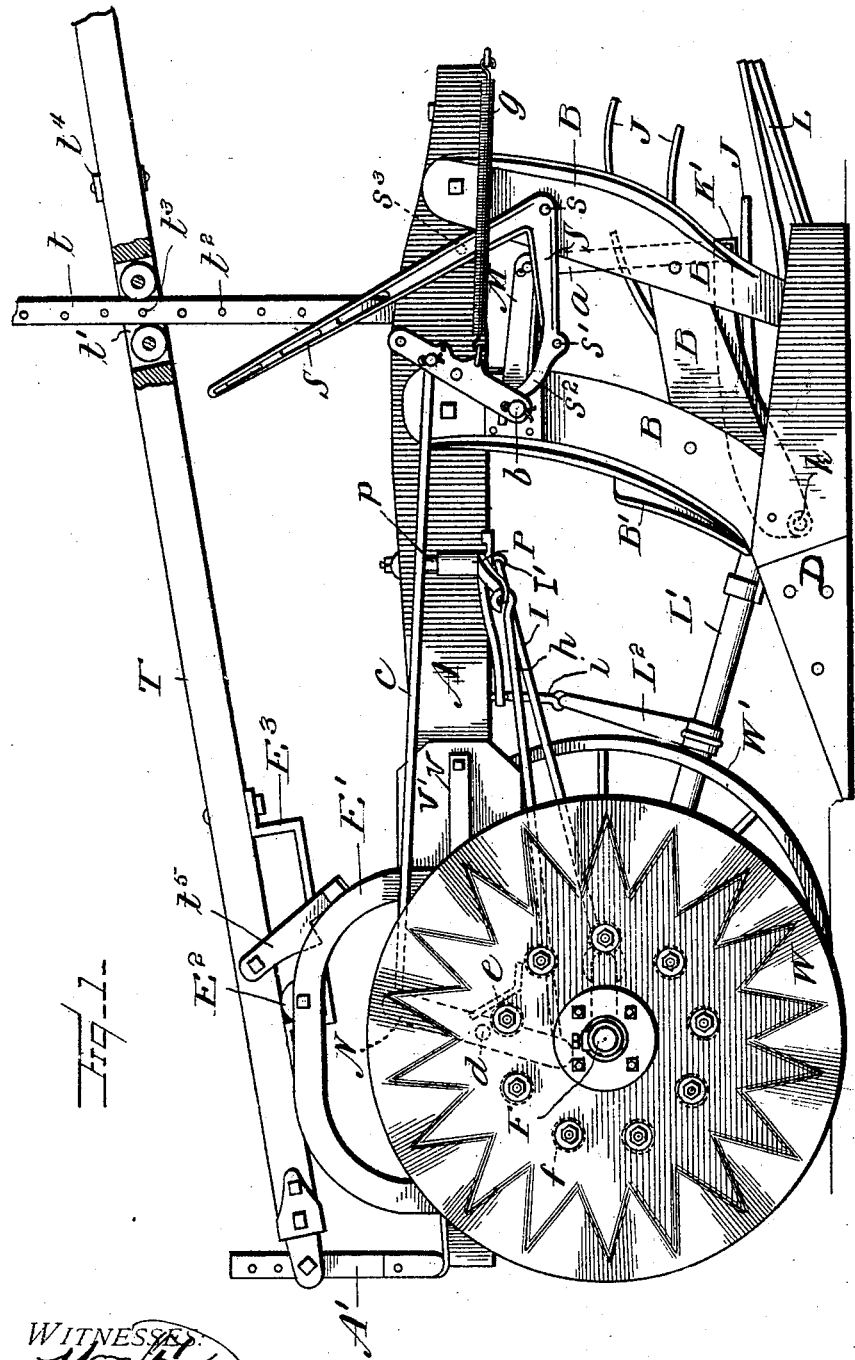
Figure 2:
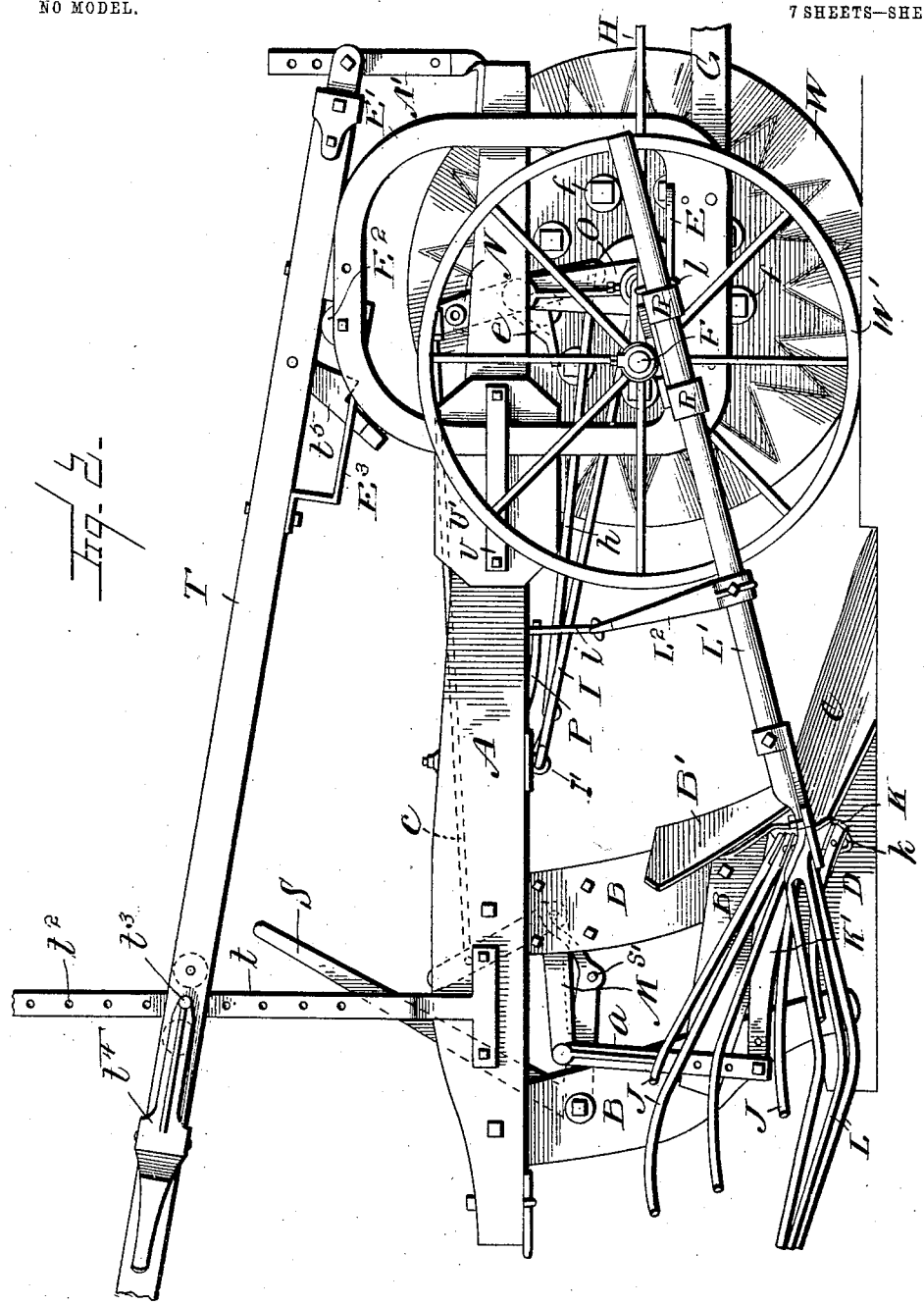

Figure 1 is a side elevation (from the traction-wheel side) of a potato-digger embodying my improvements in their preferred form. Fig. 2 is a like elevation from the opposite side. Fig. 3 is a plan of the same. Fig. 4 is a longitudinal vertical sectional elevation of the truck and its associated parts. Fig. 5 is a sectional elevation on line 5 5, Fig. 4. Figs. 6 and 7 are sectional side elevations showing the skeleton or grid-like moldboard and the separator-fork at the two extremes of their vibratory movement. Fig. 8 is a like elevation showing these parts in the position they occupy when their actuating mechanism is out of gear with the traction-wheel. Figs. 9 and 10 are rear elevations of the parts in the positions shown in side elevation in Figs. 6 and 7, respectively. Figs. 11 to 15 are perspective views of detached parts. Fig. 11 is a view of the lever N, which engages and is operated by the traction-wheel, and the post O, to which said lever is pivoted. Fig. 12 is a view of the angle-lever P, from which motion is communicated to the separator-fork. Fig. 13 is a view of the pin and its supporting-bracket, on which lever P is mounted. Fig. 14 is a view of the casting K, on which are secured the tines of the skeleton moldboard, together with the connections between it and the angle-lever M. Fig. 15 is a view of the lifting-lever S, by which the mechanism which actuates the moldboard and separator-fork is thrown out of gear with the traction-wheel. The view is of the inner face of said lever.

A is the beam, B is the standard, C is the share or shovel, and D is the landside. Both landside and share are secured to the standard in any suitable way, and the standard in turn is secured to the beam.

E is the truck or frame, to which is fixed the axle F. On the axle ends are mounted the wheels W W', one of which, W, is a traction-wheel, made in this instance of malleable sheet-steel drop-pressed into the shape shown in the drawings.

G is the tongue, rigidly secured to the truck, and H is the clevis. The beam is connected to the wheeled truck-frame by the draw-bar I, jointed at its rear end to an eyebar I' on the beam and at its other end formed or provided with an eye or sleeve which encircles and can turn on the axle F. It is by this bar that the beam and the parts carried by it are drawn along as the wheeled truck moves forward.

The skeleton moldboard consists of tines or fingers J and a base K, consisting of a metallic casting to which the tines are secured. The base is jointed to the machine, so that it will oscillate upon a transverse horizontal axis, for which purpose it is sleeved at $k$ upon a horizontal cylindrical hub $j$, secured to the inner face of the standard, and projecting thence horizontally and crosswise of the machine beneath the rear of the share C. The tines are secured to the casting K, with their ends on a line slanting upwardly toward the standard. In other words, the line of tines at this point follows substantially the contour of the adjacent rear edge of the share on the prolongation of which they are, and they thence extend rearwardly, curving outwardly and somewhat upwardly, so as to simulate in their collective outline the contour of the acting face of a moldboard. Under this arrangement it will be noted that the vibration of the screen will throw the earth not merely upwardly, but outwardly as well, while the screen itself acts as a moldboard to turn over the row delivered to it from the shovel or share. The turned-over material side-delivered from the skeleton moldboard is delivered upon a fork or separator L, which is arranged so that it will drag on the ground alongside of the plow, as shown, this device aiding effectively in the work of separation. The separator-fork L has an oscillating movement upon its supporting-stem L' as an axis in a direction to throw its load toward the skeleton moldboard.

As the machine moves forward the potato-row as it passes back over the share or shovel onto the vibratory skeleton or grid-like moldboard is by the latter thoroughly pulverized and the tubers separated from the soil except, as hereinbefore indicated, in extremely deep cultivation, in which case the oscillating separator-fork amply supplements the action of the moldboard in effecting a complete separation.

Obviously various means can be employed to impart these movements to the skeleton moldboard and the separator-fork, respectively. Those now preferred for the purpose are as follows: From the inner end of the casting K (which is the base of the skeleton moldboard) extends rearwardly an arm K', which at its back end is by a connecting-rod $a$ joined to one arm of an angle-lever M, sleeved at its elbow upon a horizontal pivot pin or bar $b$, secured to and projecting laterally from the standard B. The other arm of said lever M by a connecting-rod $c$ is joined to the upper arm of a lever N, pivoted at $d$ on a horizontal axis to the upright supporting-post O, secured to the truck-frame. The lever N is provided with a laterally and rearwardly projecting V-shaped lug $e$, which is in the path of roller-studs $f$ on the inner face of the traction-wheel W. In this instance there are nine of these roller-studs arranged at equal intervals apart, in a circle of which the axis of the traction-wheel is the center. A coiled spring $g$, Fig. 1, attached at one end to the lever M and at its other end to the beam A, exerts a constant pull upon the lever in opposition to the lifting motion of the roller-studs $f$. As the machine moves forward the roller-studs successively meet and lift the lug, with the effect of swinging forward the upper arms of the levers N and M, and then as they pass beyond the lug the spring $g$ pulls the levers forcibly back, thus keeping the skeleton moldboard in continuous vibration.

For the purpose of varying the normal tilt or elevation of the skeleton moldboard according to the needs of the work and the character of the soil the connecting-rod $a$, as seen more clearly in Fig. 14, has formed in it a number of holes $a'$, placed one above the other, in either one of which may be fitted the joint-pin or bolt which connects the rod with the arm K', and, similarly, to vary the throw or range of vibratory movement of the skeleton moldboard the upper arm of the angle-lever M has formed in it a number of holes $c'$, Fig. 14, at different distances from the axis of the lever, into either one of which may be placed the joint-pin which connects the lever to the connecting-rod $c$.

The separator-fork L is operated from the lever N. The lower arm of lever N by a connecting-rod $h$ is joined to one arm of an angle-lever P, Fig. 12, sleeved at its elbows upon a vertical axle $p$, Fig. 13, on a stand or bracket secured to the beam A, the other arm of said lever by a connecting-rod $i$ being joined to a radial arm L² on the stem L' of the separator L. The cylindrical stem L' extends through and is capable of turning axially in a tubular bearing-piece R, which is mounted upon and can turn on the axle, being for this purpose formed with a sleeve $r$, which fits on the end of the axle which projects beyond the wheel W'. The stem is held in place by a split key $l$, which passes in front of the bearing K transversely through one of a series of holes in the stem L', which is thus prevented from drawing out from the bearing R as the machine moves forward. The sleeving of the bearing R upon the axle permits the separator-fork L to adapt itself to the inequalities of the ground as it moves along and also permits the bearing to be reversed, so as to bring it above instead of below the axle, thus varying the fore and aft tilt of the separator-fork. The vibratory movement of the lever N produces, through the agencies described, oscillatory movement of the separator-fork L upon its stem L' as an axis, as will be understood without further explanation.

On occasions—as, for example, in going to and coming from work—it is desirable to stop the vibratory movement of the skeleton moldboard and separator-fork. To this end a lifting-lever S, Figs. 1 and 15, having the form of an angle-lever, is pivoted at its elbow, as at $s$, to the standard B. Its longer arm serves as a handle. Its shorter arm has on it a toe $s^2$, which rests on the hub of lever M, and a laterally-projecting stud $s'$, which normally is under the lower arm of lever M in the position shown in Fig. 1. If the lifting-lever, however, be pulled back to the position shown in Fig. 8, the stud will lift and push forward the arm of the lever M, which it engages, to an extent sufficient to turn the lever M, and consequently the lever N, far enough to raise the lug $e$ on the latter above the path of travel of the roller-studs $f'$. The parts are thus thrown out of gear and motion stops. The stud $s'$ when in the position shown in Fig. 8 has passed back beyond the dead-center, so that the pressure upon it of the arm of lever M, which it engages, serves only to hold the lever S in its lifting position. When lever S reaches this position, a stop $s^3$ on it brings up against a projection on standard B and arrests further rearward movement.

Whenever it is desired to use the machine without the separator-fork, the latter and its operating mechanism can be readily removed from the machine. All that is needed is to remove the split key $l$ and slip the stem L' from its bearings, disconnect the connecting-rod $h$ from the lower arm of lever N, and lift the lever P off from its axle $p$. All parts of the separator and its operating mechanism can now be bodily taken away.

The part B' on the front edge of the standard B above the share is a narrow sheet-steel plate, which acts merely as a fender and deflector and in a measure as a colter.

It remains to describe the devices whereby the plow can be raised, as in going to and coming from work, so as not to enter the soil, and the plow point or share can be adjusted so as to make a deeper or shallower cut, as desired. The means for this purpose are as follows: To an upright standard A' at the front end of the beam A is jointed the front end of a lever T, whose fulcrum is at $E^2$ in approximately oval-shaped vertical parallel irons E', rigidly secured to and forming part of the truck E. The beam A extends between these irons, which form guides between which it can play up and down. The lever T overhangs and extends rearwardly in the same parallel plane with the beam. The fulcrum $E^2$, on which the adjusting-lever T bears, is a roller, which is mounted between the two irons E'. It will be seen that by means of the lever T the beam can be tilted in a fore-and-aft direction in such manner as to raise the share to a position where it will not engage the soil or to depress the share, so as to cause it to enter the ground more or less deeply, as desired. The draw-bar I, which, as before said, is sleeved at one end on the axle and at the other end is secured to the beam A, permits the bodily rising and falling, as well as the endwise tilting, of the beam. In operating the adjusting-lever T the latter has some movement lengthwise of the machine. It is for this reason that it rests loosely and without confinement on the fulcrum-roller $E^2$, the latter being held to the lever by a strap-guide $E^3$, attached to the under side of the lever, longitudinally of which guide the roller $E^2$ is free to move.

To hold the adjusting-lever T in the desired position, any suitable means can be employed. In the present instance there is an upright standard $t$ on the beam passing through a vertical slot $t'$ in the lever and having formed lengthwise of it a series of holes $t^2$, into one or the other of which will enter the nose $t^3$ of a spring-pressed hinged latch-lever $t^4$ of usual type, mounted on the lever T and adapted to be manipulated by hand to withdraw it from engagement with the standard $t$. Under this arrangement the leverage is so great that the beam can be readily raised and lowered with one hand.

In order to lift the plow-point out of engagement with the soil, as in going to and from work, the lever T is depressed to its lowest position and is locked by its latch-lever $t^4$ in that position. Then lever T, thus locked to the beam, is lifted, carrying with it the beam, which is tilted or raised at its rear end until the plow-point is raised above the ground. During this movement the lever T moves forward on the roller $E^2$ far enough to allow the hinged dog $t^5$ on the beam T to drop over and engage the axle of the roller, and thus lock the parts in this position.

To assure the beam and the irons in their proper relations to one another, the rear limbs of the irons E' pass down freely through the intervals between strap-guides $v$ and metallic plates $v'$, the guides being secured to the exterior of the plates and the plates being secured to the sides of the beam, as shown.

Having described my improvements, I state in conclusion that I do not limit myself strictly to the hereinbefore set forth structural details of the machine in which said improvements are embodied, since manifestly the same can be considerably varied without departure from my invention; but

What I claim as new, and desire to secure by Letters Patent, is as follows:

1. In a machine of the character described, the combination with the truck, the beam, the standard and the share, of a vibratory skeleton moldboard, serving both as a separatingscreen and as a moldboard to turn over outwardly the soil which passes to it from the share, and means for actuating said moldboard, substantially as and for the purposes hereinbefore set forth.

2. In a machine of the character described, the combination with the truck, the beam, the standard and the share, of a vibratory skeleton moldboard, a laterally-oscillatory separator-fork alongside of the moldboard, and means for actuating the moldboard and the separator-fork, substantially as and for the purposes hereinbefore set forth.

3. In a machine of the character described, the combination with the truck, the beam, the standard and the share, of a vibratory skeleton moldboard, means for actuating said moldboard, and means whereby the share can be tilted fore and aft to different angles and be raised or lowered, substantially as and for the purposes hereinbefore set forth.

4. In a machine of the character described, the combination with the truck, the beam, the standard and the share, of a vibratory skeleton moldboard, actuating mechanism for said moldboard and means for varying the normal tilt of the moldboard and the throw of its actuating mechanism, substantially as and for the purposes hereinbefore set forth.

5. In a machine of the character described, the combination with the wheeled supporting-truck, the beam, the standard, and the share, of the vibratory skeleton moldboard, the oscillatory separator-fork, actuating mechanism for said moldboard and separator-fork operatively connected to and deriving its movement from one of the truck-wheels, and means for interrupting at will the operative connections between said actuating mechanism and truck-wheel, substantially as and for the purposes hereinbefore set forth.

6. In a machine of the character described, the combination with the wheeled truck, the beam, the standard, the share, the vibratory skeleton moldboard and actuating mechanism therefor, of a draw-bar connecting the beam to the truck-frame having its rear end jointed to the beam and its front end jointed to the truck-frame, an adjusting-lever arranged above and lengthwise of the beam, and jointed at its front end to the beam, a fulcrum in the truck-frame upon which the lever bears and with reference to which it is longitudinally movable, and means for holding the lever in its adjusted position, substantially as and for the purposes hereinbefore set forth.

7. In a machine of the character described, the combination with the wheeled truck and the digger proper supported by the same, of a separator-fork arranged alongside of the digger proper, the separator-fork stem, a bearing in which said stem is supported and capable of axial oscillation, and an arbor on the truck-frame on which said bearing is hung so as to be capable of oscillation upon a horizontal axle transverse to that of the separator-fork stem, and means for oscillating the separator-fork stem, substantially as and for the purposes hereinbefore set forth.

In testimony whereof I affix my signature in presence of two witnesses.

DANIEL Y. HALLOCK.

Witnesses:
 W. LEE HELMS,
 GEO. W. REA.